United States Patent Office 2,993,546
Patented July 25, 1961

2,993,546
WOOL PRESSES
Thomas Vincent Slattery, Jamestown, South Australia, Australia
Filed Feb. 15, 1960, Ser. No. 8,644
Claims priority, application Australia, Feb. 17, 1959
2 Claims. (Cl. 177—129)

This invention relates to improvements in and to wool presses and in particular it relates to a press of the type under which the wool is placed and is then compressed in a bale and when the correct quantity of wool is contained in the bale it is discharged from the press.

One of the problems in operating a press of this type is to be able to determine the weight of wool in the bale.

To ascertain the exact weight of wool in the bale it is necessary at the present time to finish the bale and then remove it from the press and if it is found that it is underweight, it is almost impossible to make up the weight unless the bale can be put back for further pressing.

The object of this invention therefore is to provide an improved press or attachment to a press which will allow determination of the weight of wool in a bale prior to removal of the bale from the press.

This is achieved according to this invention by arranging the press to comprise, a base on said press adapted normally to rest on the ground, lifting members adjustably attached to said press adjacent to the said base to also contact the ground, a weighing scales having one part thereof connected to said press through a control member and another part connected to said lifting members whereby said press can rest on the ground through the said base in one position of the said control member and can be raised from the ground through said scales by the lifting members in another position of the said control member to allow the total weight of the press and a bale therein to be read.

In this way during the filling of a bale it is possible from time to time to actually measure the weight of the wool in the bale and if it is below a required minimum, further wool can be added to the bale until the required weight has been achieved.

Figure 1:
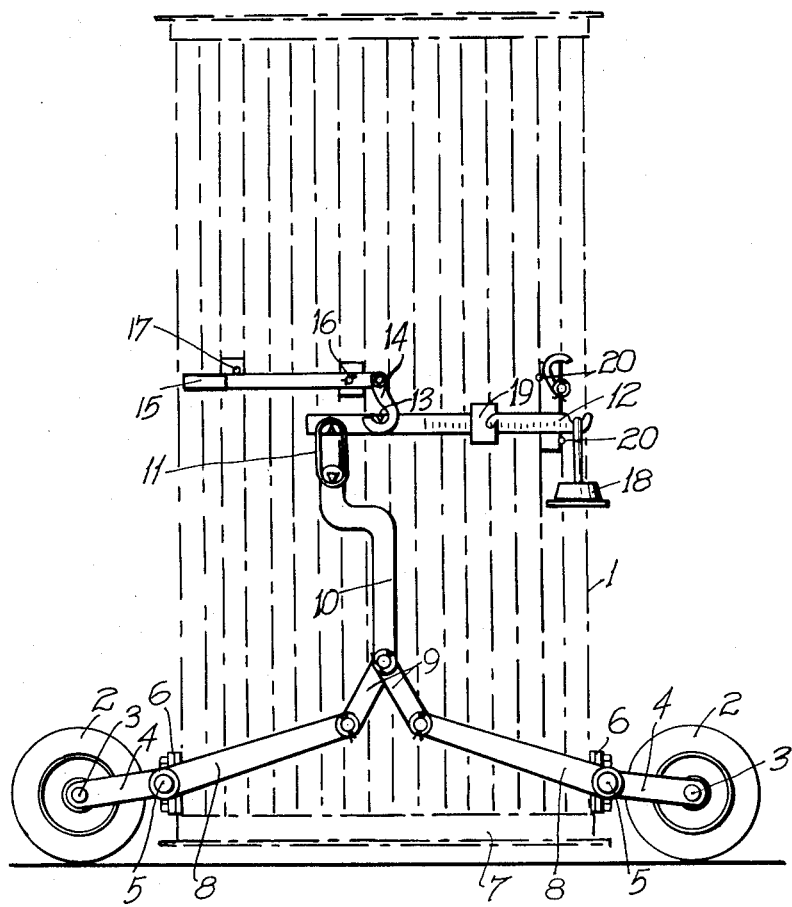
Figure 2:
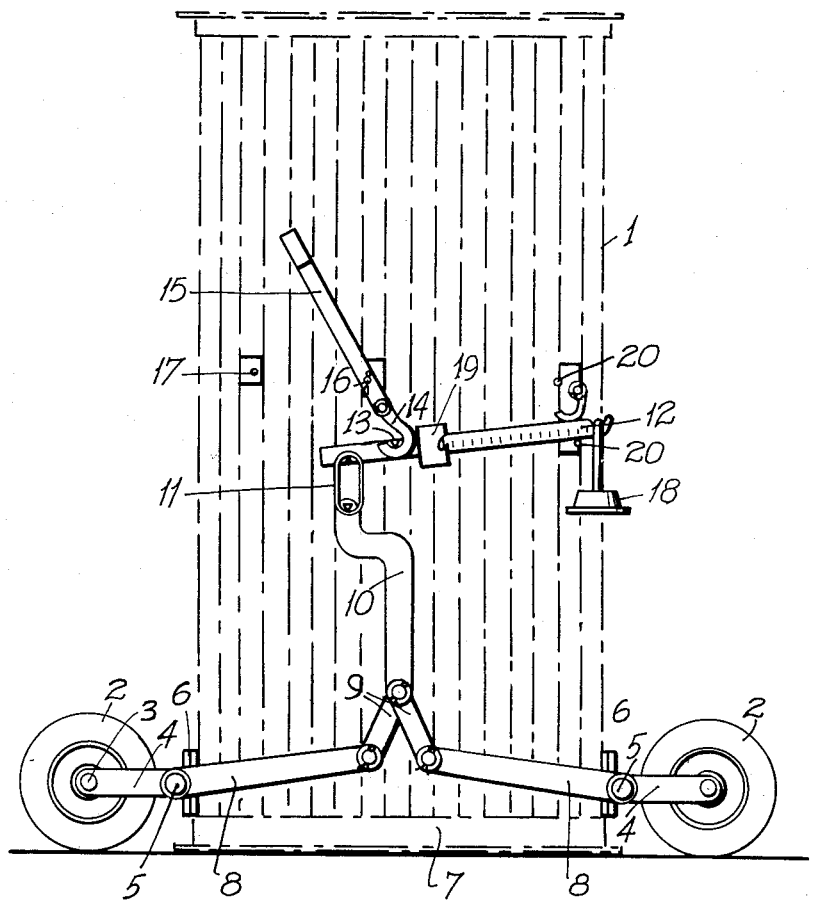
Figure 3:
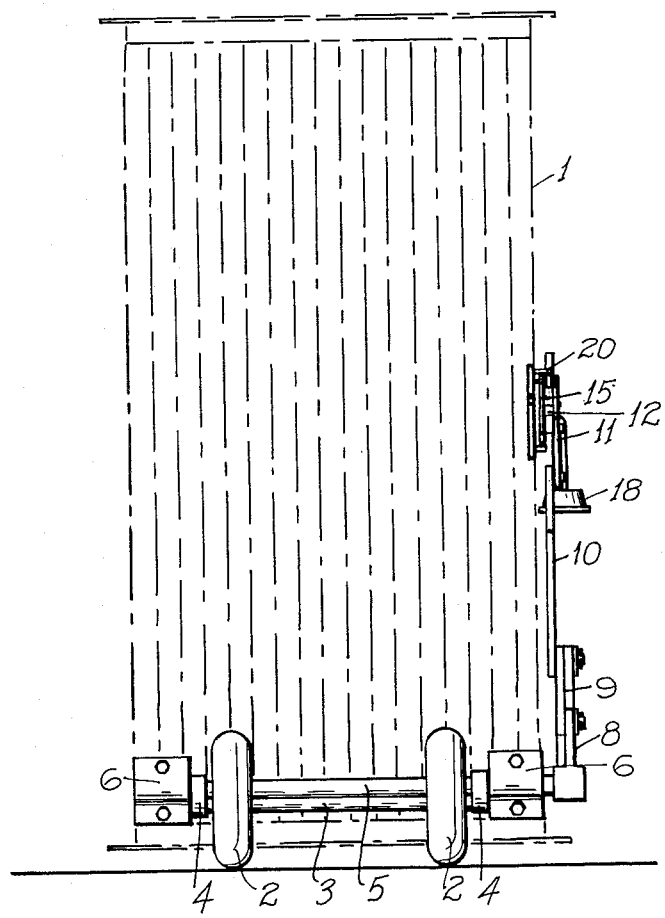

The actual construction of the invention can be very considerably varied, but to enable the invention to be fully understood, an embodiment will now be described with reference to the accompanying drawings in which:

FIG. 1 is a side view of the invention applied to a press, the scales being in weighing position, the press being shown schematically in broken lines. As any type of press generally in use can be fitted with the invention, FIG. 2 is a similar view but showing the scales inoperative, and FIG. 3 is a front elevation of FIG. 1.

According to the form of the invention illustrated, the press comprises vertical sides 1 mounted on wheels 2 which are adjustable in height and form lifting members so that the weight of the press can be transferred from the ground to the wheels and vice versa. The wheels 2 are mounted on axles 3 carried on arms 4 secured to shafts 5 carried on bearings 6 secured to the sides 1 just above the base 7.

The shafts 5 have arms 8 secured thereto which are coupled by links 9 to a bar 10 which is in turn connected by a link 11 to one end of the scale beam 12. The scale beam 12 has a fulcrum 13 engaged by the hook 14 which is hinged to a control lever 15 connected to the press by a pivot 16, the control lever 15 having a stop pin 17 projecting into the path, the pin 17 being attached to one of the sides 1. The scale beam 12 has the usual weights 18 and 19 on it, and has limit stops 20 on either side of it to control the swing of its free end.

The arrangement of the various members is such that when it is desired to weigh the assembly it is only necessary to set control bar 15 to transfer the weight on to the scales.

It will be seen that when the control lever 15 is released from the stop pin 17, it swings up to the position shown in FIG. 2, allowing the inner end of the scale beam 12 to fall and permitting the base 7 of the press to rest on the ground.

Normal filling of the wool press can then proceed.

When it is desired to test the weights of the wool in the press, the control lever 15 is pulled down and engaged under the pin 17, lifting the fulcrum 13 into weighing position and, of course, pulling up the bar 10, links 9 and the inner ends of the arms 8, thereby rotating the shafts 5 and forcing the wheels 2 down on to the ground until the base 7 of the press is clear of the ground and weighing can then take place.

It will be realised that the invention can be carried out in a large number of ways but the basic principle involved is to so arrange the press in relation to a scale that normally the press can be used to fill a bale in the usual manner but when it is desired to check the weight of the bale it is only necessary to transfer the weight of the press with the bale therein to the scales and to take a reading and deduct the known weight of the press, thereby obtaining the weight of the bale without having to remove it from the press.

What I claim is:

1. Improvements to wool presses having sides terminating in a base which normally rests on the ground, comprising ground engaging lifting members adjacent to the base of the said press, coupling means between said ground engaging lifting members and said press to allow said lifting members to be raised or lowered in relation to the said press, a scale beam having a fulcrum intermediate its ends, link means connecting said coupling means to said scale beam on one side of said fulcrum, a weight on said scale beam on the other side of said fulcrum, means on said side to limit movement of the weight end of said scale beam, and a control member hinged on the said side engaging said fulcrum to raise or lower said fulcrum whereby the weight of said press is transferred to the ground either through the said base or through the said scales depending on the position of the said control member.

2. Improvements to wool presses having sides terminating in a base which normally rests on the ground, comprising ground engaging lifting members adjacent to the base of the said press, shafts carried in bearings on the said press, arms fixed to the said shafts engaging the said lifting members, further arms fixed to said shafts, a scale beam on one side of said press having a fulcrum intermediate its ends, link means coupling said further arms to said scale beam on one side of said fulcrum, a weight on said scale beam on the other side of said fulcrum, stop means on said side to limit movement of the weight end of said scale beam, and a control member hinged on the said side engaging said fulcrum to raise or lower said fulcrum whereby the weight of said press is transferred to the ground either through the said base or through the said scales and ground engaging members depending on the position of the said control member.

References Cited in the file of this patent
UNITED STATES PATENTS

| | | |
|---|---|---|
| 628,663 | Hysore | July 11, 1899 |
| 1,169,109 | Anderson | Jan. 25, 1916 |

FOREIGN PATENTS

| | | |
|---|---|---|
| 732,479 | Great Britain | June 22, 1955 |
| 761,259 | Great Britain | Nov. 14, 1956 |